US006662368B1

(12) United States Patent
Cloonan et al.

(10) Patent No.: US 6,662,368 B1
(45) Date of Patent: Dec. 9, 2003

(54) VARIABLE SPARE CIRCUIT GROUP SIZE AND QUANTITY HAVING MULTIPLE ACTIVE CIRCUITS

(75) Inventors: Thomas J. Cloonan, Lisle, IL (US); Daniel W. Hickey, Oswego, IL (US); Ubaldo Cepeda, Oswego, IL (US); Gerald P. Ryan, Lake Zurich, IL (US)

(73) Assignee: Arris International, Inc., Duluth, GA (US)

( * ) Notice: Subject to any disclaimer, the term of this patent is extended or adjusted under 35 U.S.C. 154(b) by 34 days.

(21) Appl. No.: 09/659,193

(22) Filed: Sep. 11, 2000

(51) Int. Cl.[7] .......................... H04N 7/16; H04N 7/173
(52) U.S. Cl. ................... 725/111; 370/217; 375/222
(58) Field of Search .......................... 725/111, 110, 725/114, 116, 117, 93, 138, 146, 147; 370/216, 217; 714/3, 4, 6; 375/222; H04N 7/16, 7/173

(56) References Cited

U.S. PATENT DOCUMENTS

| | | | | |
|---|---|---|---|---|
| 4,245,342 A | * | 1/1981 | Entenman | 340/825.01 |
| 4,385,392 A | * | 5/1983 | Angell et al. | 340/825.01 |
| 4,700,340 A | * | 10/1987 | Beranek et al. | 370/218 |
| 4,929,906 A | * | 5/1990 | Voyce et al. | 330/149 |
| 5,027,002 A | * | 6/1991 | Thorton | 307/35 |
| 5,146,452 A | * | 9/1992 | Pekarske | 370/228 |
| 5,321,394 A | * | 6/1994 | Carlton et al. | 340/825.01 |
| 5,627,837 A | * | 5/1997 | Gillett | 714/708 |
| 5,696,766 A | * | 12/1997 | Yeung et al. | 370/515 |
| 5,901,024 A | * | 5/1999 | Deschaine et al. | 361/67 |
| 5,953,313 A | * | 9/1999 | Aso et al. | 370/220 |
| 6,137,793 A | * | 10/2000 | Gorman et al. | 370/360 |
| 6,202,170 B1 | * | 3/2001 | Busschbach et al. | 714/11 |
| 6,230,326 B1 | * | 5/2001 | Unger et al. | 725/111 |
| 6,449,249 B1 | * | 9/2002 | Cloonan et al. | 370/217 |

* cited by examiner

Primary Examiner—Vivek Srivastava

(57) ABSTRACT

A plurality of daisy-chained switching circuit cards are each coupled to a different active circuit card. Feed-through circuit cards are each coupled to spare circuit cards having substantially identical circuitry to the active circuit cards. The feed-through circuit cards are also daisy-chained with the switches on the switching circuit cards. The switching circuit cards can replace the feed-through circuit cards and the active circuit cards replace the spare circuit cards in order to vary the size of the spare groups (a group of spare circuit cards and active circuit cards) and also the quantity of the spare groups.

20 Claims, 9 Drawing Sheets

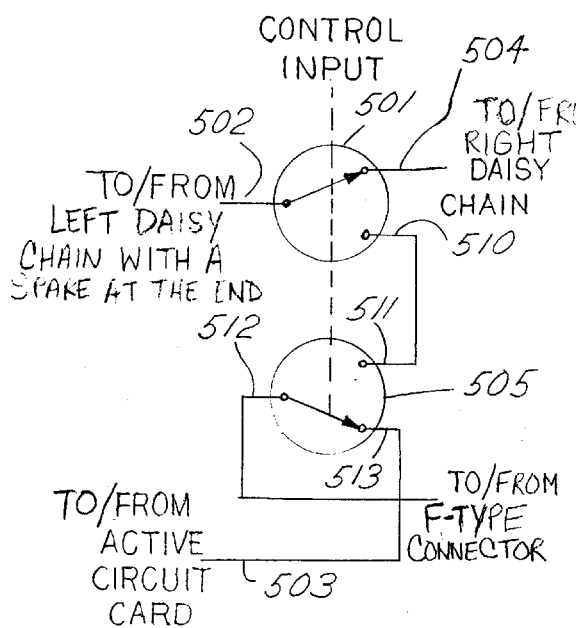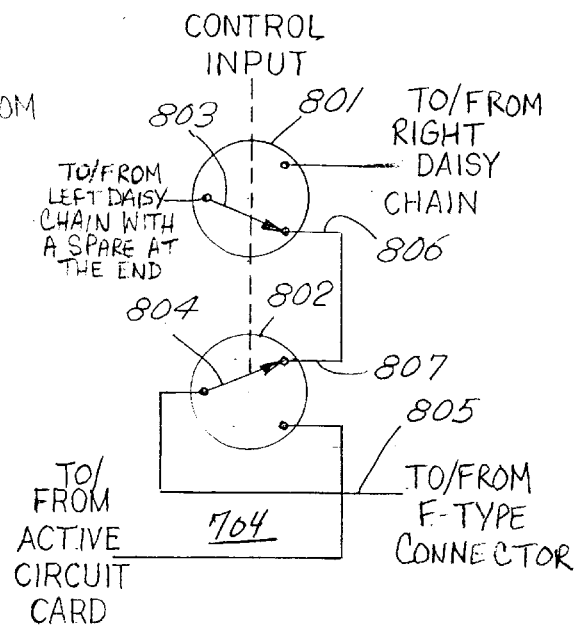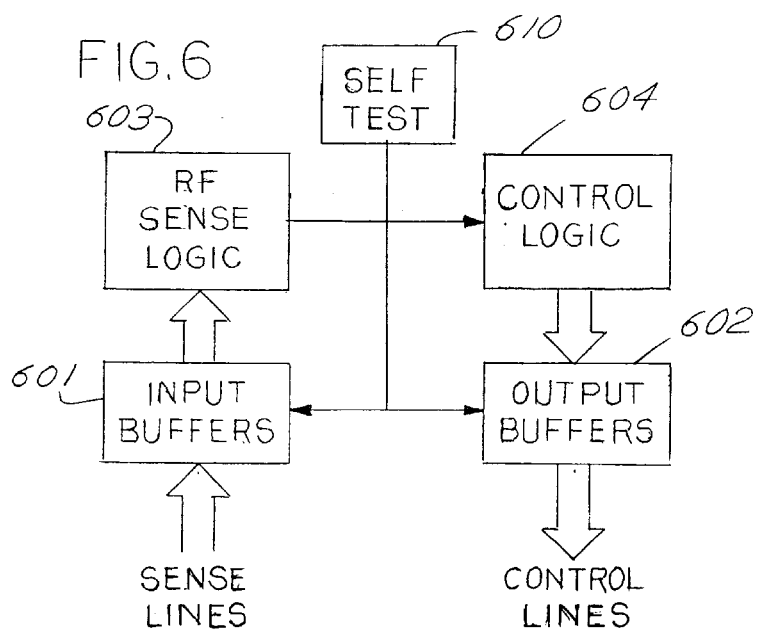

VARIABLE SPARE CIRCUIT GROUP SIZE AND QUANTITY HAVING MULTIPLE ACTIVE CIRCUITS

FIELD OF THE INVENTION

The present invention relates generally to grouping and switching of spare circuits. Particularly, the present invention relates to varying the size and quantity of spare circuit groups in response to varying the number of active circuits.

DESCRIPTION OF THE RELATED ART

In order to provide more products to their subscriber base, cable television companies are offering access to the Internet through their cable modem (CM) boxes. The benefits in using the cable companies instead of a dial-up Internet Service Provider is multiple services under one bill, always-on access, and, in some cases, higher speed access.

In order to provide their customer's with Internet access, the cable companies use some of the 50–800 MHz spectrum typically set aside for their television channels to provide the bandwidth required for the data transfers. A typical cable system has the bandwidth to provide 100 television channels to its subscribers. Each NTSC television signal requires 6 MHz of bandwidth.

In order for a cable subscriber to access the Internet through their cable television provider, the subscriber must have a CM. The CM is similar to the Cable Modem Termination System (CMTS) equipment required at the cable company's headquarters, except for the greater size required at the headquarters. This is to accommodate a greater number of signals than is required by the home modem.

The home CM box and the CMTS use well-known Ethernet frames to communicate between them. The cable system, however, uses a different modulation scheme, Quadrature Amplitude Modulation (QAM), than is normally used in an Ethernet scheme.

Using QAM, the downstream (from the cable company equipment to the home CM) data rate is in the range of 30–40 Mbps for each 6 MHz channel. This can typically accommodate between 500 and 2000 subscribers. The more subscribers that the cable company tries to fit in that spectrum, however, the lower the bandwidth that is provided to each subscriber.

The upstream data flow is different and more complex. In the past, cable companies did not have to worry about providing bandwidth for the customer to communicate in the upstream direction. Pay-per-view movies and sports events, however, required this ability. The cable companies, therefore, set aside the 5–42 MHz spectrum to allow the home CM to communicate in the upstream direction. The cable companies now use this 5–42 MHz spectrum to provide the necessary upstream access to the Internet from the home CM.

Cable companies, as well as other Internet Service Providers, are currently introducing Quality of Service (QoS) to Internet access. The current Internet routing model of "best effort" service now provided to all users, packets, and traffic flows is being replaced with services that differentiate between packets.

FIG. 1 illustrates a typical prior art CMTS block diagram. The CMTS typically is comprised of a cable interface card (101) to provide the interface signals and modulation to the signals transmitted to the home modem. An Ethernet card (110) interfaces the CMTS to the Internet by providing appropriate timing, control, and data signal formats for the Internet. A buffer circuit (105) between the cable interface card (101) and Ethernet card (110) stores data in both the upstream and downstream directions when the processing in either the cable interface card or the Ethernet card is slower than the incoming data.

FIG. 2 illustrates a typical prior art circuit card layout of a CMTS. This CMTS is comprised of a number of cable interface cards (201–205) connected to a mid-plane (210). Each cable interface card (201–205) has an associated switch card (211–215). Each cable interface card is associated with a number of cable customers.

When one of the cable interface cards fails, those customers lose service until the failed card is manually swapped out for a good one. Additionally, the cable company may want to increase their capacity by reducing the reliability of the equipment. This would require being able to easily increase the number of cable interface circuit cards while decreasing the number of spare circuits without replacing the entire card cage structure. There is a resulting unforeseen need for a more reliable cable interface system to provide different size and quantity of spare/active circuit groups depending on the number of active circuits that need back-up circuits.

SUMMARY OF THE INVENTION

The present invention encompasses a system for providing variable spare circuit group sizes and variable quantities of spare circuit groups. This enables a cable company to change the number and ratio of spare circuit card and active circuit cards without changing the card cage structure. The system comprises a plurality of active circuits that provide information signals and at least one spare circuit that is substantially similar to each of the plurality of active circuits.

A plurality of switching circuits, each of which is coupled to a different active circuit of the plurality of active circuits, comprises a switch that is daisy-chain coupled with a switch from an immediately preceding and/or an immediately succeeding switching circuit. One feed-through switch circuit for each spare circuit is daisy-chain coupled to one of an immediately preceding and an immediately succeeding switching circuit or an immediately succeeding switching circuit.

A controller circuit is responsible for monitoring RF signals that are provided by the active circuits to each of the switching circuits. When an RF signal is absent or when an active circuit is found to be faulty through the use of real-time monitoring techniques, the controller circuit instructs the switch to change position such that the spare circuit replaces the failed active circuit.

The present invention provides the capability, by daisy-chaining the switches and the feed-through circuits, of making different size spare groups of spare circuits with active circuits as well as different numbers of spare groups. This is accomplished by replacing a feed-through circuit with a switching card circuit and the paired spare circuit with an active circuit.

BRIEF DESCRIPTION OF THE DRAWINGS

FIG. 5 shows a preferred embodiment of a 2×2 switch in accordance with the RF protection switch system of FIG. 3.

FIG. 6 shows a block diagram of a master controller in accordance with the present invention.

FIG. 8 shows a 2×2 switch that has been switched in accordance with FIG. 7.

DETAILED DESCRIPTION OF THE PREFERRED EMBODIMENT

The present invention provides reliable and economical redundancy for cable interface circuit. By rapidly switching a spare cable interface circuit card into the place of a failed cable interface circuit card, a customer's service can be restored quickly, providing more reliable service.

Figure 3:
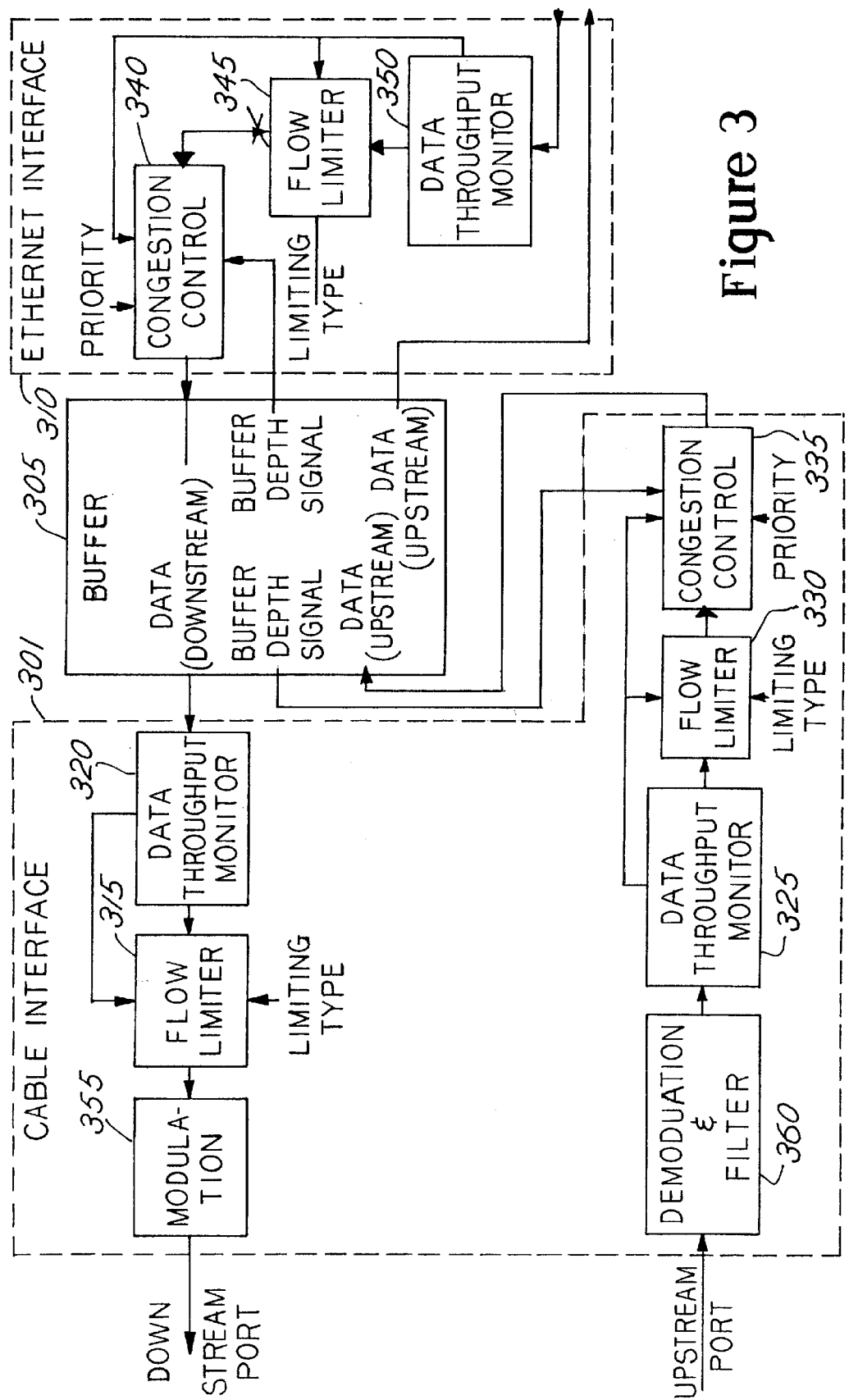
FIG. 3 shows a block diagram of the cable modem termination system apparatus of the present invention.

FIG. 3 illustrates the preferred embodiment cable modem termination system (CMTS) apparatus of the present invention. The CMTS apparatus is comprised of a cable interface (301) that is coupled to a buffer circuit (305). The buffer circuit (305) is coupled to an Ethernet interface (310). In the preferred embodiment, each of the individual circuits (301, 305, and 310) resides physically on separate circuit boards. In alternate embodiments, any circuits having substantially the same function can reside on one circuit board or even one integrated circuit. In other words, the present invention is not limited to three separate circuit boards.

The cable interface (301) is responsible for interfacing the CMTS to the home cable modem apparatus. The cable interface (301) also provides the functions of modulation and demodulation.

The cable interface circuit is comprised of a downstream packet flow path and an upstream packet flow path. The downstream packet flow path is comprised of a data throughput monitor (320) that is coupled to a flow limiter (315). The data throughput monitor (320) has an input that is coupled to the buffer circuit (305) from which the data packets flow and a feedback from the upstream path. The feedback from the upstream path is to allow a first CM to talk with other CMs. The data throughput monitor (320) has the task of determining the rate of data packet flow.

In the preferred embodiment of the CMTS, the downstream data packet flow rate is typically either 30 or 40 Mbps for each 6 MHz channel, using QAM techniques. Alternate embodiments use other flow rates. The cable company decides which data packet flow rate depending on the outcome desired by the company. The lower data rate is less susceptible to noise while the higher data rate can include more data per unit of time for the customers.

The data packet flow rate signal is fed into the flow limiter (315). This signal controls the flow limiter function. If the flow is greater than a predetermined level, $T_{max}$, the data packet flow can be limited. The flow limiter (315) reduces the data rate by dropping packets until the flow is reduced to below $T_{max}$.

Another input to the flow limiter (315) is the "limiting type" input. This control input is set by the cable company depending on how strict they wish a customer to adhere to the rules. If the "limiting type" input is set to "soft-limiting", the flow limiter (315) allows the data rate to go above the set data rate by a predetermined amount without dropping any packets.

Some cable companies may strictly limit a customer to $T_{max}$. In this case, the "limiting type" control input is set to "hard-limiting". If the data rate goes over the set hard limit, the flow limiter (315) drops any packets that force the customer to exceed $T_{max}$. The output of the flow limiter (315) is coupled to the cable that runs to the customers' cable modems.

The output of the flow limiter (315) is input to the modulator (355). This block (355) performs the QAM needed to transmit the data to the CMs.

The upstream data path is comprised of a demodulator and filter (360) that converts the QAM signal into data bits in order to be processed by the other blocks in the upstream path. The demodulated data bits are input to a data throughput monitor (325) that is coupled to the upstream port from the customer's CM. This data throughput monitor (325) has the same functionality as the downstream monitor (320) of monitoring the data rate but in the upstream direction to the Internet.

In the preferred embodiment, the upstream data rate can be in the range of 320 kb to 10.24 Mbps. Alternate embodiment use other rates.

The upstream data throughput monitor (325) is coupled to a flow limiter (330). This flow limiter has similar functionality to the flow limiter (315) in the downstream path. The upstream path flow limiter (330) has the data rate input from the data throughput monitor (325) as well as the "limiting type" control input that, in the preferred embodiment, is set to either "hard-limiting" or "soft-limiting" depending on the cable company rules. As in the downstream flow limiter (315), the upstream flow limiter, depending on the "limiting type" input, drops all packets that force the customer to exceed $T_{max}$.

The upstream path further comprises a congestion control block (335) that is coupled to the upstream data path out of the flow limiter (330). The data packets from the upstream data path flow through the congestion control block (335) to the buffer circuit (305). The function of the congestion control block (335) is to drop packets when the buffer depth is reaching a maximum point. By dropping the packets before they reach the buffer, the buffer will not overflow.

In order to accomplish the task of congestion control, the congestion control block (335) has control inputs that are used to determine when to drop packets and which packets to drop. In the preferred embodiment, these control inputs include the data rate signal from the upstream data throughput monitor (325), a buffer depth signal from the buffer (305), and a priority signal.

The data rate signal from the upstream data throughput monitor (325), as described above, quantizes the data rate and feeds that value to the congestion control block (335). The buffer circuit depth signal from the buffer circuit (305) instructs the congestion control block (335) as to the depth of the buffer. In other words, if the buffer (305) is 75% full, the buffer depth signal instructs the congestion control block (335) of this.

The priority signal that is input to the congestion control block (335) informs the congestion control of the priority of each packet. This is important in determining which packets to drop.

A group of packets is assigned a priority based on the customer's level of service plan. If the customer has signed up for the basic service plan and paid the smallest fee for the most basic service, his packets are assigned a low priority. This priority is embedded in a packet identification that is assigned to the group of packets and is decoded when the group of packets enters the cable interface.

If the customer has signed up for the premium service plan with the cable company, his packets are assigned the highest priority. If the customer has signed up for any service plans that are in between the premium and the basic plans, this priority is also assigned to each packet. As described before, the priority is added to the packet identification for a particular group of packets.

A customer may also decide to dynamically change his service level for a given session. In this case, different packet groups from that particular customer will have different priorities assigned to different packet identifications.

Figure 1:
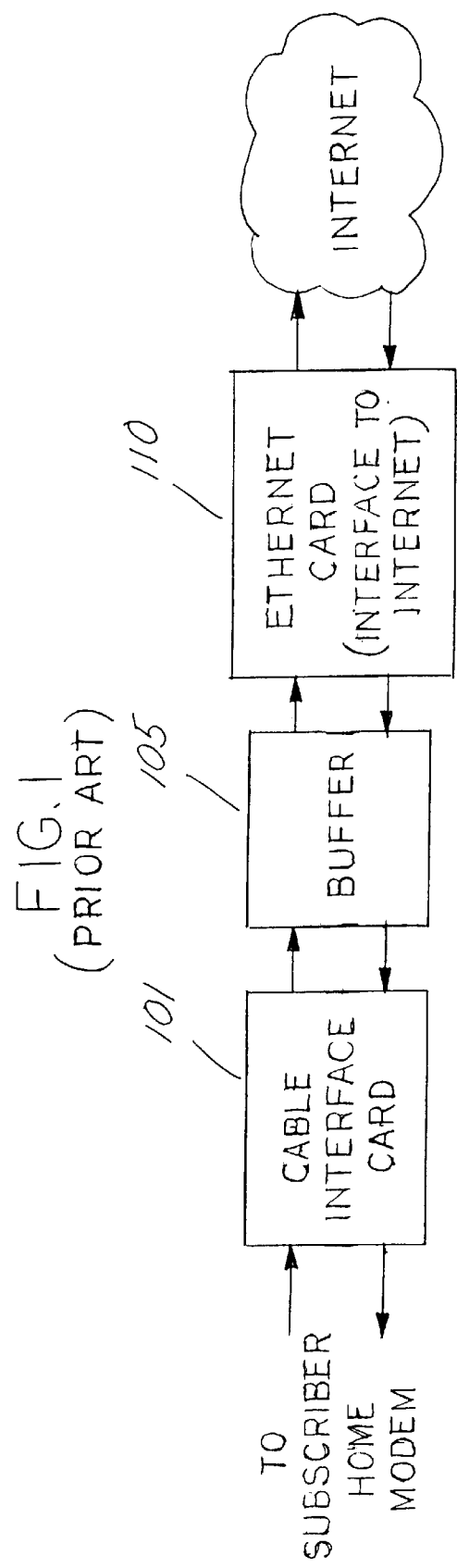
FIG. 1 shows a block diagram of a typical prior art cable modem termination system.
Figure 2:
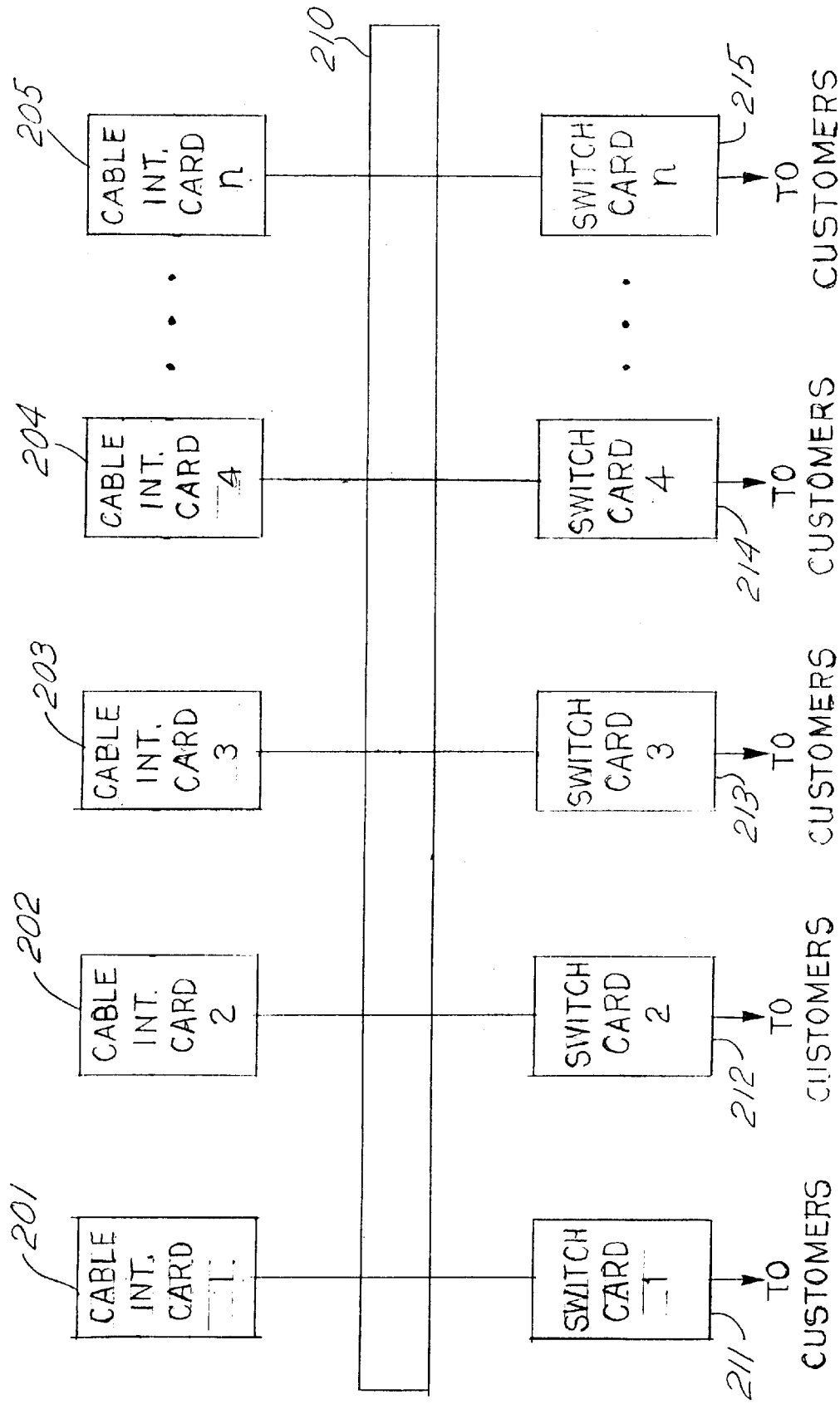
FIG. 2 shows a block diagram of a typical prior art card layout of cable interface cards and RF switches.

As described subsequently in other figures, the congestion control block (335) of FIG. 2 uses the priority assigned to a group of packets to determine how to process that particular group of packets. The output of the congestion control block is input to the buffer circuit's upstream data flow input.

The buffer circuit (305) stores the packets until the Ethernet circuit (310) has time to process that packet. The packets are fed from the buffer circuit (305) to the Ethernet circuit (310) as more processing time is freed up.

The downstream path of the Ethernet circuit (310) is comprised of a data throughput monitor (350) that is coupled to the connection to the Internet. This monitor (350) provides substantially the same function as the previously described data throughput monitors on both the upstream and downstream paths.

The data packets from the Internet flow from the data throughput monitor (350) to the Ethernet's circuit flow limiter (345). This flow limiter (345) has substantially the same functionality as the above described flow limiters. This flow limiter also has the same inputs as described previously: the quantized data rate and the "limiting type" control input.

The data packets flow from the flow limiter (345) to the congestion control block (340). As in the upstream congestion control block (335), the Ethernet's downstream congestion control block (340) has the three control inputs to determine which packets to drop: the quantized data rate, the buffer depth signal, and the packet priority signal. The congestion control block then drops a particular packet based on these control signals.

The downstream data flows from the congestion control block to the buffer circuit (305). The buffer circuit (305) stores the packets until the cable interface circuit has the processing time to work on additional packets.

The buffer circuit (305) is comprised of 128 MB of RAM in the preferred embodiment. Alternate embodiments use other values of RAM or even other types of memory instead of RAM. The alternate types of memory include hard drives or other types of temporary memory.

Most of the functions illustrated in FIG. 3 may be implemented in various ways. These functions can be performed in software by a processor or multiple processors performing each function. Each function can also be implemented in discrete logic hardware, a digital signal processor, or some other form of programmable logic.

Figure 4:
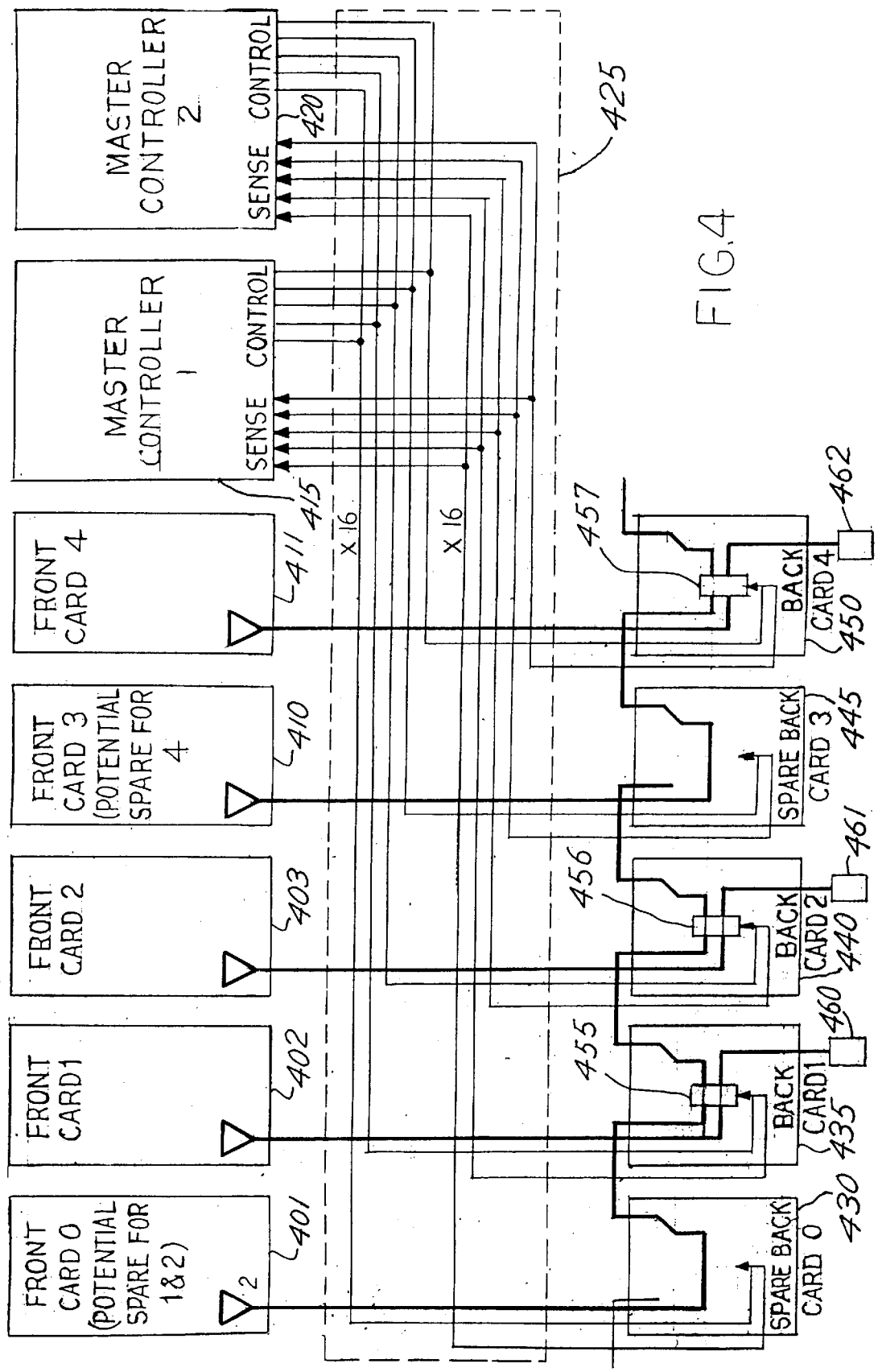
FIG. 4 shows a block diagram of an RF protection switch system of the present invention.

FIG. 4 illustrates a block diagram of a preferred embodiment of the RF protection switch system of the present invention. This figure illustrates the approximate layout in a circuit card cage of the various circuits that comprise the RF protection switch system.

The RF protection switch system is comprised of a plurality of active cable interface circuit cards (402, 403, 411). Only three active circuit cards are shown for purposes of clarity. In the preferred embodiment, up to 16 active circuit cards may be used. Alternate embodiments use other quantities of active circuit cards.

In addition to the active cable interface circuit cards, a number of spare circuit cards (401 and 410) having substantially identical circuits to the active cable interface circuit cards are present. In the preferred embodiment, these spare circuit cards incorporate exactly the same circuitry. Alternate embodiments, however, may have additional circuits that provide minor changes to the functionality of the circuit card.

In the preferred embodiment, the spares are not used during normal operation of the system. As will be explained subsequently, the spares are switched into the path of the incoming (upstream) RF signal from the customer cable modem when an active circuit card fails, and the spares are also switched into the path of the departing (downstream) RF signal to the customer cable modem when an active circuit card fails.

In the embodiment of FIG. 4, a spare cable interface circuit card (401) is assigned to back-up two active circuit cards (402 and 403). The second spare cable interface circuit card (410) is assigned to back-up the remaining active circuit card (411). Alternate embodiments assign the spare circuit cards to different active cards and also different quantities of active circuit cards.

For purposes of clarity, only two spare cable interface circuit cards are illustrated. In the preferred embodiment, there is one spare cable interface circuit card for the first two active circuit cards and another spare cable interface circuit card for the third active circuit card. Alternate embodiments use other numbers of spares to active circuit cards.

Both the active and spare cable interface circuit cards (402, 403, 411, and 401, 410) are connected to a mid-plane circuit board (425) also known as a mid-plane circuit card. The mid-plane circuit card is comprised of a circuit card connector for each circuit card. Additionally, each circuit card connector is coupled to the other connectors via traces on the mid-plane circuit card (425). The mid-plane circuit card (425) and its card connectors are well known in the art and will not be discussed further.

Each cable interface circuit card has a respective RF switching card (430, 435, 445, and 450). Even the spare cable interface circuit cards (401 and 410) are paired with an RF switching card (430 and 445 respectively). The RF switching cards (430, 435, 440, 445, and 450) are also inserted into circuit card connectors on the mid-plane card (425).

Each RF switching card (435, 440, and 450) that is paired with an active cable interface circuit card (402, 403, and 411 respectively) is comprised of a set of F-type connectors (460–462) that interfaces the switching card to the cable that eventually runs to the customer's cable modem.

In the preferred embodiment, the RF switching cards are comprised of 2×2 switches (455–457) that perform the switching. The RF switching cards (430, 435, 440, 445, and 450) are daisy-chained together through the 2×2 switches (455–457).

Two of the switching cards (430 and 445) do not use switches. These switching cards (430 and 445) are paired with the spare cable interface circuit cards (401 and 410 respectively) and function only to continue the propagation of signals within the daisy chain of switches (455–457).

Additionally, in the preferred embodiment, the switching cards (430 and 445) without the 2×2 switches do not have F-type connectors to output or receive an RF signal to or from home cable modems since these switching cards are paired with spare cable interface circuit cards.

In the preferred embodiment, the switches (455–457) on the switch cards (435, 440, and 450) are solid-state relays. Alternate embodiments use other types of switches such as discrete transistors, mechanical relays, or any other type of switch that can perform substantially the same function.

The preferred embodiment of the construction of the 2×2 switches is illustrated in FIG. 5. The pole (502) of the first switch (501) is coupled to the left daisy-chain trace in the mid-plane that ultimately connects to the RF signal on the switch card (430 or 445) that is associated with one of the spare cable interface circuit cards.

The connection to the spare associated switch card (430 or 445) may be a direct connection, as illustrated in FIG. 4, with two of the switch cards (435 and 450). The connection to the spare (430 or 445) may also be a daisy chain connection through the 2×2 switches on the other switch cards (435 and 440).

The first throw (504) of the first switch (501) is coupled to the right daisy chain as illustrated above. The second throw (510) of the first switch (501) is coupled to the first throw (511) of the second switch (505).

The pole (512) of the second switch (505) is coupled to the F-type connector on the switch card. This F-type connector can support either inputs or outputs. The second throw (513) of the second switch (505) is coupled to the input or output of its paired active cable interface circuit card.

Referring again to FIG. 4, two master controller cards (415 and 420) are present to control the operation of the RF switch cards (430, 435, 440, 445, and 450). A first master controller is active (415) while the second master controller (420) is a back-up controller in case the first controller fails. Both master controller cards (415 and 420) are operating simultaneously, however, only one is actively coupled to the switch cards at any time.

Each master controller (415 and 420) also has a control signal line going to each of the RF switch cards (430, 435, 440, 445, and 450). Each control signal line transmits a control signal from the active master controller (415 or 420) to one of the 2×2 switches in the case of a failed cable interface circuit card.

The master controllers have signal sense lines coming from each of the 2×2 switches on each of the RF switch cards. The sense lines indicate whether a master controller's control signal is being received at the switch card. If incorrect signals are being received from the RF switch card, that RF switch card is considered failed and must be replaced since the operation of the card is uncertain.

Both the first and second master controllers are coupled to the mid-plane bus through input/output buffers that have a high-impedance state. Both master controllers are performing, either continuously or periodically, a self-test routine to determine their state. If the active master controller fails, the second master controller can take over operation of the system.

Once the active master controller fails, the input/output buffers are put in the high impedance state to remove it from the bus. This prevents the failed controller from interfering with the back-up active controller while it is operating.

FIG. 6 illustrates a block diagram of a preferred embodiment of the master controllers of the present invention. Each master controller is comprised of the input buffers (601) coupled to the input sense lines from the switch cards. As described above these buffers have a high impedance mode.

The input buffers are coupled to a sense block (603) that monitors the sense lines from the switch cards and determines when a switch card is no longer receiving a control signal. The lack of a control signal indicates that a switch circuit card has failed and should be replaced.

The sense block (603) transmits the location or number of the appropriate switch card to control logic (604). The control logic uses the information from the sense block (603) to generate and transmit a switch card repair message to an operation management terminal.

The control logic (604) also receives packet loss rate information and power level information from each of the cable interface cards and can use this information to determine when a cable interface card should be switched out of the path of the user data.

To initiate this switch, the switch control signals are output through output buffers (602) that also have high impedance capability. Both the input and the output buffer's (601 and 602) control inputs are coupled to a self-test block (610) that determines when the master controller has failed and the high impedance state of each buffer is required. The self-test block (610) then outputs the control signal that places the input and output buffers (601 and 602) into their high impedance states.

Figure 7:
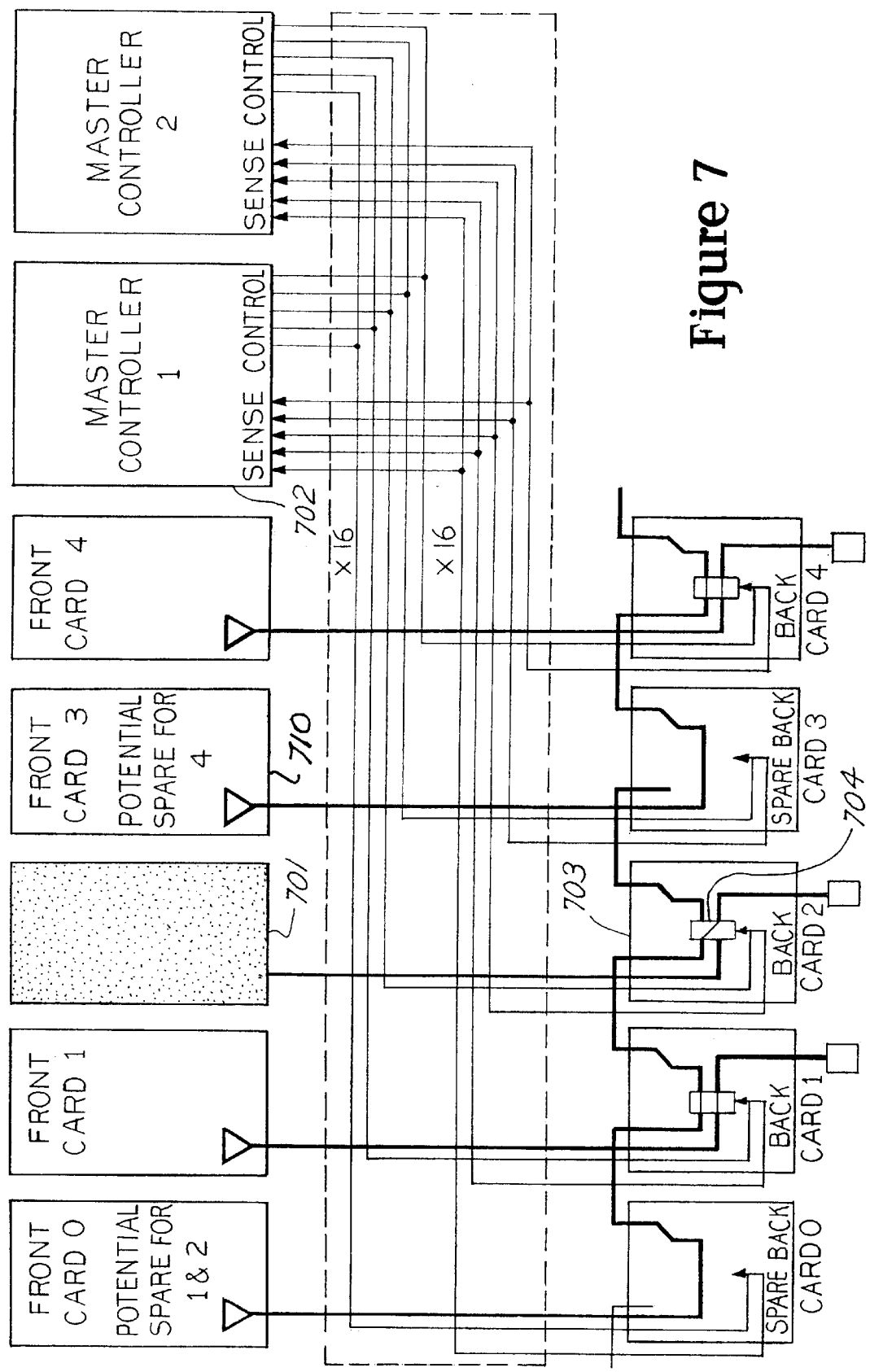
FIG. 7 shows a block diagram of an RF protection switch system having a failed cable interface circuit card.

FIG. 7 illustrates the RF protection switch system of FIG. 4 with a failed cable interface circuit card (701). The active master controller (702) has a fault in the cable interface circuit card (701) and has instructed the paired switch card (703) to throw its 2×2 switch (704).

The orientation of the switch (704) of the switch card (703) that is paired with the failed cable interface circuit card (701) is illustrated in FIG. 8. This figure illustrates how the poles of the switch (704) now direct the signal between the F-type connector and the left daisy-chain towards the spare cable interface circuit card (710).

FIG. 8 shows that the pole (803) of the first switch (801) is now down to connect it with the throw (806) that goes to the second switch (802). The pole (804) of the second switch (802) is now connecting the F-type connector (805) to the first throw (807) of that switch (802).

Figure 9:
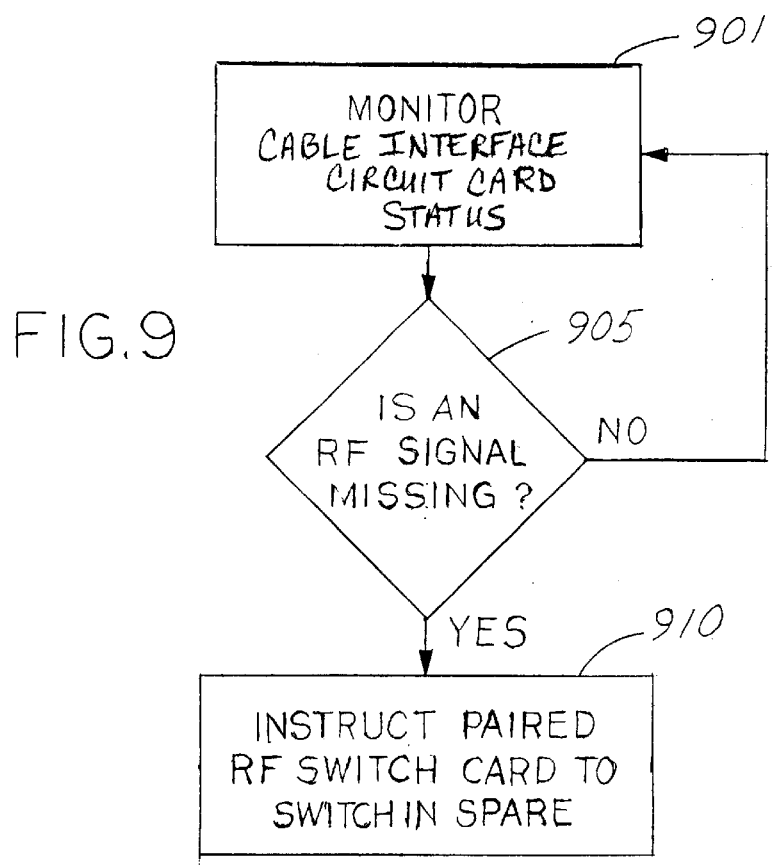
FIG. 9 shows a flowchart of a fault detection and switching process of the present invention.

FIG. 9 illustrates a flowchart of the switching process of the present invention. The process begins by monitoring the packet loss rate or power level for each of the cable interface cards (step 901). If the packet loss rate is lower than a pre-configured threshold and the power levels are higher than a pre-configured threshold, the master controllers continue to monitor (step 905).

If an the packet loss rate is higher than a pre-configured threshold or the power levels are lower than a pre-configured threshold (step 905), the cable interface circuit card coupled to that particular RF switching card is considered failed and must be switched out of the circuit (step 910). In this case, the master controller sends a signal to the RF switch card that is paired with the failed cable interface circuit card to switch the 2×2 switch over (as described above) such that the spare cable interface circuit card is now outputting and receiving signals in place of the failed card.

The daisy chaining of the switches and the switching scheme described above provide the ability to vary the size and numbers of the groups that include a spare circuit card. These groups are referred to herein as sparing groups.

In the preferred embodiment, a sparing group includes one spare circuit card and multiple active circuit cards. Alternate embodiments vary this ratio of spare circuits to active circuits. For example, one embodiment places one spare circuit card and one active circuit card in a sparing group, while another embodiment places one spare circuit card and ten active circuit cards in a sparing group. Multiple sparing groups of varying sizes can be set up in a single chassis.

Figure 10:
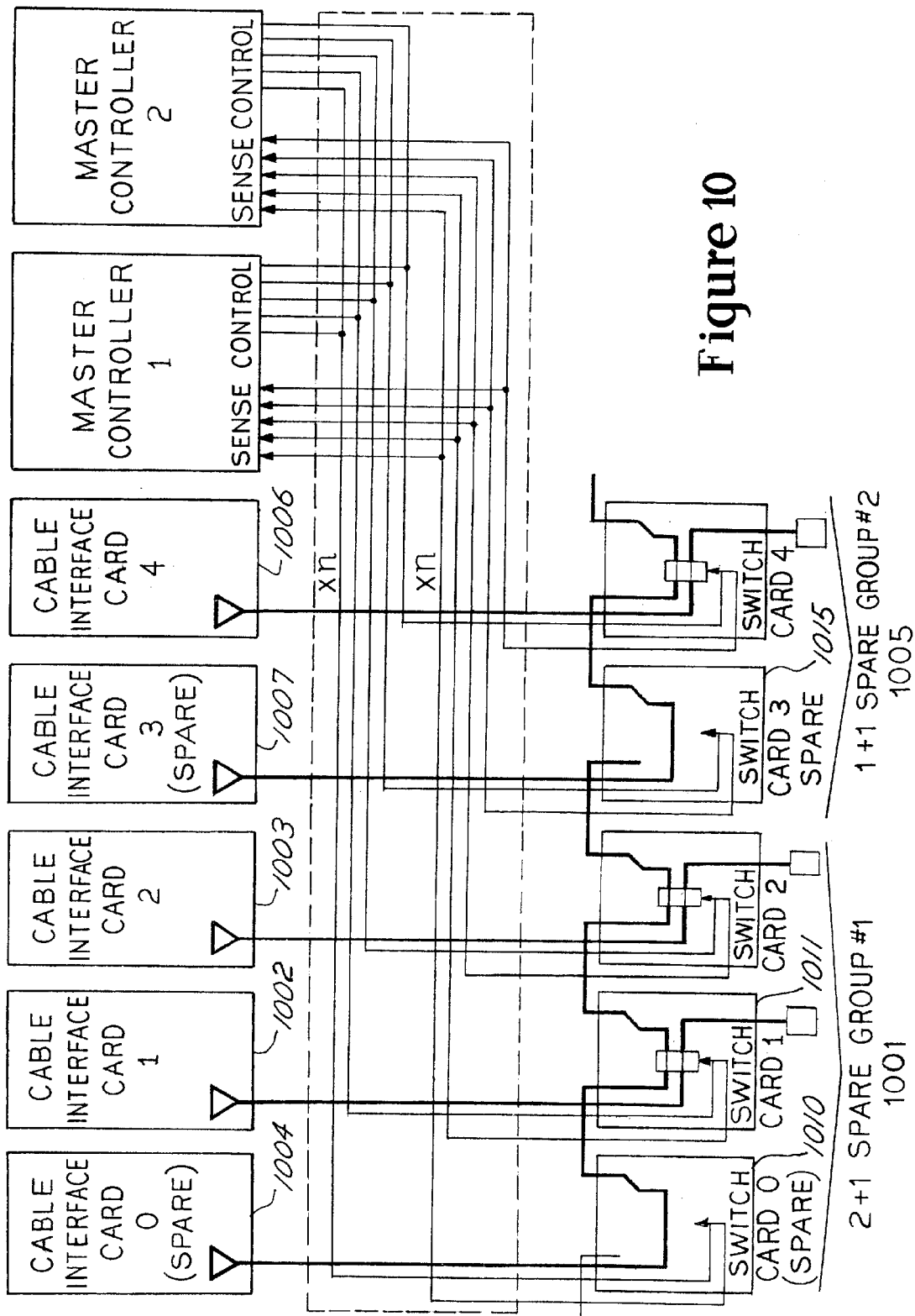
FIG. 10 shows a block diagram of an RF protection switch system having one embodiment of a sparing group.

FIG. 10 illustrates a first embodiment of spare circuit group sizes. In this embodiment, a first sparing group (1001) is comprised of two active circuits (1002 and 1003) for the first spare circuit (1004). The second sparing group (1005) is comprised of one active circuit (1006) for one spare circuit (1007).

In the embodiment of FIG. 10, the spare switching circuit card (1010), also known as a feed-through switch circuit card, that is paired with the first spare circuit (1004) is comprised of a feed-through jumper that connects to the succeeding switching circuit card (1011) in the switch daisy chain. This is also true of the second spare switching circuit card (1015), also known as the second feed-through switch circuit card, of the second sparing group (1005).

The feed-through jumper orientation enables the present invention to easily change configurations by removing the feed-through switch circuit card and replacing it with a switching circuit card that comprises a 2×2 switch and still maintain the daisy chain. By using this configuration, the sizes and quantities of sparing groups can easily be altered.

Figure 11:
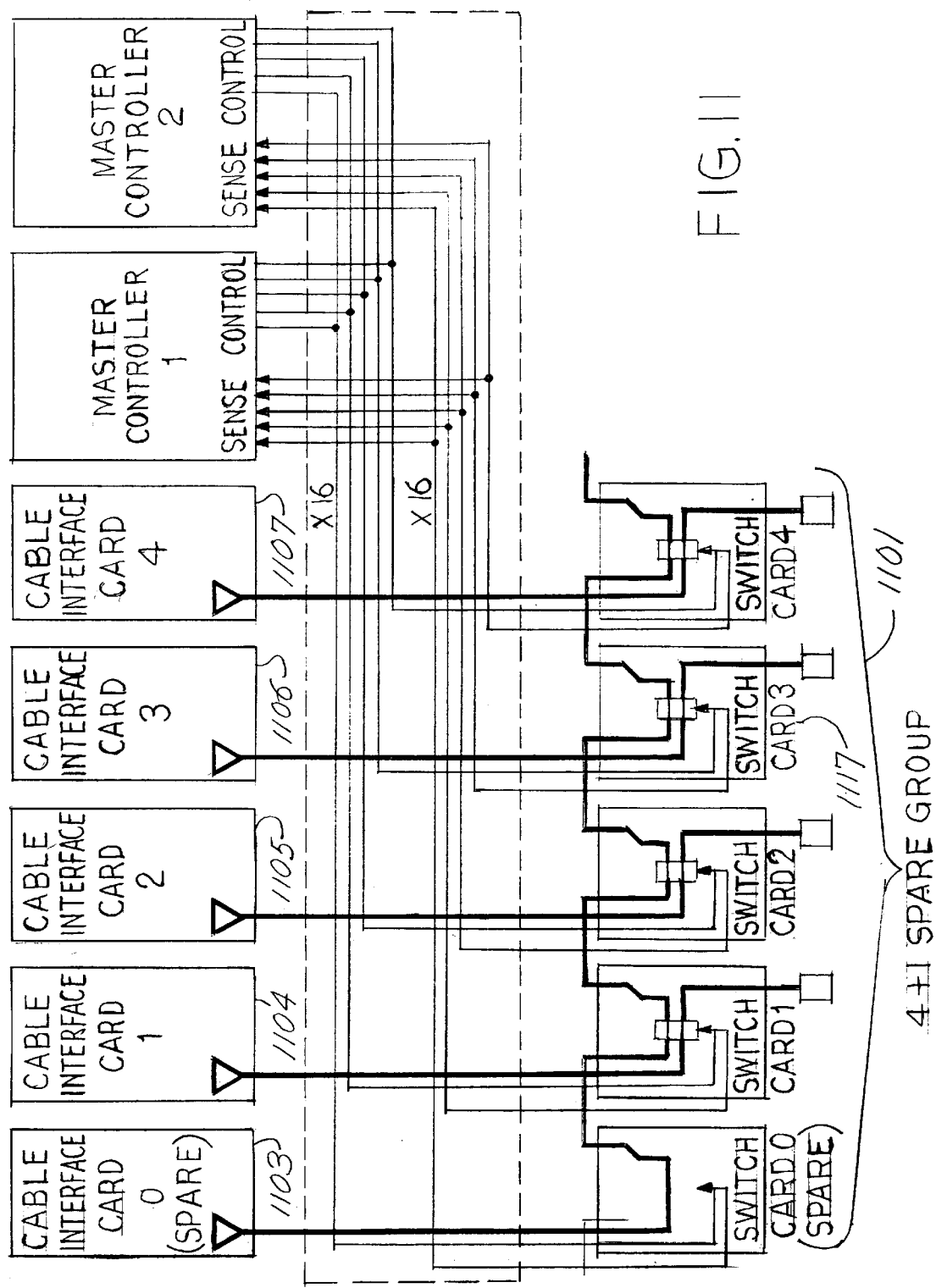
FIG. 11 shows a block diagram of an RF protection switch system having an alternate embodiment sparing group.

FIG. 11 illustrates another embodiment of the varying sparing group size of the present invention. This embodiment is comprised of one sparing group (1101). This sparing group (1101) is comprised of one spare circuit (1103) and four active circuits (1104–1107).

The embodiment of FIG. 11 was created by removing the second spare switching card (1015) of the second sparing group (1005), illustrated in FIG. 10, and replacing it with a switching circuit card (1117 of FIG. 11) in order to enlarge the first sparing group (1001 of FIG. 10). This embodiment decreases the number of spare circuits available in the event an active circuit fails but increases the number of active circuits available for customer use, thereby increasing the number of customers that can be served by the cable company. This is a trade-off that is determined by the cable company, depending on the level of reliability desired.

The number of circuit card slots illustrated in FIGS. 10 and 11 are for illustration purposes only. Additional embodiments may increase the number of circuit card slots in the apparatus such that a sparing group may include one spare circuit and three or more active circuits. There is no limit to the size and/or number of sparing groups using the daisy-chained switching scheme of the present invention.

By increasing the size of a sparing group (the number of active circuits to each spare circuit), the reliability of the sparing group decreases but the number of customers that can be serviced increases. The size of a sparing group may also change over the course of time as the subscriber base of the cable company increases.

The cable interface circuits, both active and spare, of the embodiments of FIGS. 10 and 11 are described above. Additionally, the master controllers of the embodiments of FIGS. 10 and 11 are described above in the description of the embodiment illustrated in FIG. 4.

As described above in the embodiment illustrated in FIG. 4 the switching cards are comprised, in the preferred embodiment, of 2×2 switches. Alternate embodiments use other switch configurations and still remain within the bounds of the present invention.

The RF output and input signals of the embodiments of FIGS. 10 and 11 also use the same or similar F-type connectors as described in other embodiments of the present invention. Alternate embodiments use other types of connectors to achieve the same results.

Figure 12:
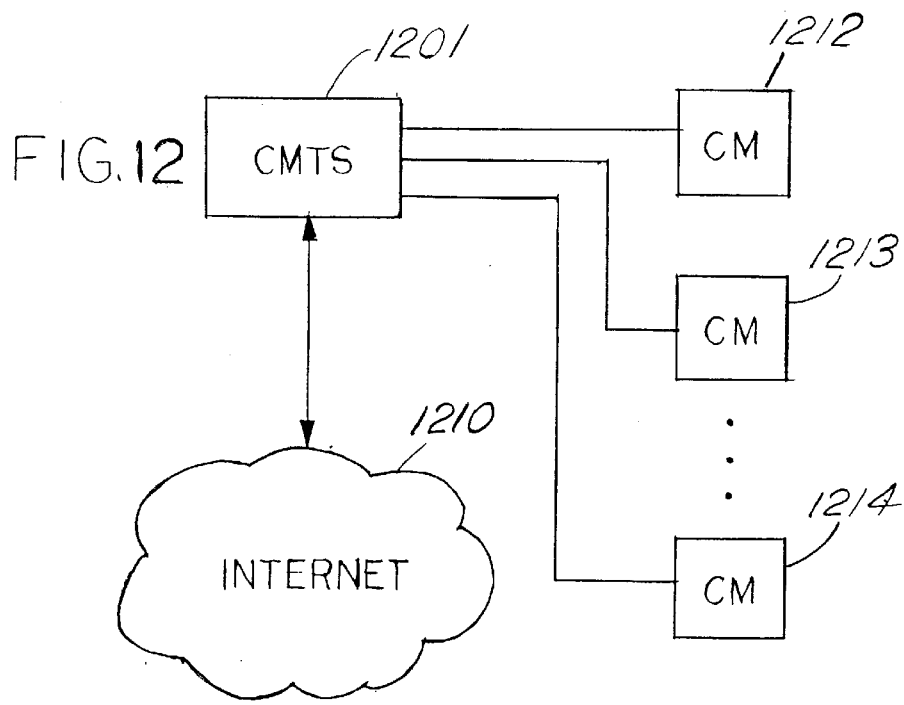
FIG. 12 shows a block diagram of a system incorporating the cable modem apparatus of the present invention.

FIG. 12 illustrates a cable system block diagram incorporating the RF protection switch system of the present invention. This system is comprised of the CMTS (1201) that is coupled to the Internet (1210). The CMTS is located at the cable company headquarters.

The CMTS is coupled to a larger number of CMs (1212–1214). For purposes of clarity, only three CMs are shown. However, as described above, the CMTS may communicate with thousands of CMs, depending on how the cable company set up the system.

The preferred embodiment of the present invention is in a cable modem environment in which each of the cable interface circuit cards is identical. Alternate embodiments can use this invention in any environment having circuitry or circuit cards that can be switched out as provided herein. Such embodiments can include computer and telecommunication systems. Additionally, alternate embodiments use separate circuitry that is not identical to the other circuitry providing the spare circuitry or circuit cards can substitute for the failed circuitry or circuit cards.

In yet another alternate embodiment, the signal used by the master controller to determine the state of the cable interface circuit cards is a digital control signal other than the packet loss rate information or the power level information signal generated by the cable interface circuitry. Such a digital signal includes a self-test result signal generated by self-test circuitry on the cable interface circuit card.

In summary, the process and system of the present invention provide a variable spare circuit group size in addition to variable quantities of spare circuit groups. Each active circuit card is paired with a switching circuit card and each spare circuit card is paired with a daisy-chain feed-through switch card to enable multiple combinations of spare circuit group sizes. By replacing the feed-through switch card with a switching circuit card, additional active circuit cards can be added to the spare circuit group.

We claim:

1. A cable modem system for providing variable spare circuit group sizes and variable quantities of spare circuit groups, the system comprising:

a group of one or more active circuits that provide information signals;

at least one spare circuit, each spare circuit comprising circuitry that is substantially similar to each of the group of one or more active circuits; and a plurality of switching circuits, each switching circuit being coupled to, and corresponding to, one of either the group of one or more active circuits or the at least one spare circuit, wherein each switching circuit corresponding to one of the active circuits comprises a switch having a first input which is daisy-chain coupled with an immediately preceding switching circuit, a second input coupled to said corresponding active circuit, and a connection for inputting and outputting RF signals to and from subscriber cable modems, and wherein each corresponding switching circuit coupled to one of the at least one spare circuit comprises a feed-through switch circuit with an input coupled to said spare circuit and an output which is daisy-chained coupled to a succeeding switching circuit associated with an active circuit.

2. The cable modem system of claim 1 wherein each of the at least one active circuits are embodied on separate circuit cards.

3. The cable modem system of claim 1 wherein each of the at least one spare circuits are embodied on separate circuit cards.

4. The cable modem system of claim 1 wherein each of the at least one switching circuits is embodied on separate circuit cards.

5. The cable modem system of claim 1 wherein each of the group of one or more active circuits is substantially similar to the other active circuits of the group of one or more active circuits.

6. The cable modem system of claim 1 and further comprising a master controller, coupled to the plurality of switching circuits, for monitoring the information signals from the active circuits and providing a control signal to a particular switching circuit upon failure of an active circuit coupled to the particular switching circuit.

7. The cable modem system of claim 1 wherein the information signal is a radio frequency signal comprising modulated information.

8. The cable modem system of claim 1 wherein the information signal is a digital self-test signal indicating a status of the active circuit.

9. The cable modem system of claim 1 wherein each of the plurality of switching circuits provides an output for the information signals.

10. The cable modem system of claim 1 wherein a first pole of the switch of each of the switching circuits is coupled to one of an immediately preceding feed-through switch circuit or an immediately preceding throw of the switch of a preceding switching circuit.

11. The cable modem system of claim 1 wherein a second pole of the switch of each of the switching circuits is coupled to the information signal from one of the active circuits of the plurality of active circuits.

12. A method for generating variable spare circuit group sizes and variable quantities of spare circuit groups in a cable modem termination system, the method comprising the steps of:
providing information signals from a group of one or more active circuits;
providing at least one spare circuit to backup a group of one or more active circuit card, said spare circuit having circuitry substantially similar to each of the group of one or more active circuits;
coupling a dedicated switching circuit of a plurality of switching circuits to a corresponding one of the group of one or more active circuit cards or to one of the at least one spare circuit, wherein each switching circuit card coupled to an active circuit comprises a switch having a first input that is daisy-chain coupled with an immediately preceding switching circuit, a second input coupled to said corresponding active circuit and a connection for inputting and outputting RF signals to and from subscriber cable modems, and wherein each dedicated switching circuit coupled to each spare circuit comprises a feed-through switch circuit with a single input coupled to said spare circuit and a single output which is daisy-chained coupled to a succeeding switching circuit corresponding to an active circuit.

13. The method of claim 12 and further comprising the steps of:
coupling a first controller circuit to each of the switching circuits;
the first controller circuit monitoring a status of the group of one or more active circuits; and
if the status is found to be faulty, the first controller circuit generating a control signal to the switching circuit that is coupled to the active circuit whose status was found to be faulty, such that the switch of the switching circuit is made to switch positions.

14. The method of claim 13 and further comprising the step of coupling a second controller circuit, substantially similar to the first controller circuit, to each of the switching circuits.

15. The method of claim 14 and further comprising the steps of the first controller circuit performing a self-test operation to determine a status of the first controller circuit; and
if the status of the first controller circuit indicates a malfunction of the first controller circuit, the second controller circuit taking control of the switching circuits from the first controller circuit.

16. A cable modem termination system for providing variable spare circuit group sizes and variable quantities of spare circuit groups in a cable modem environment, the system comprising:
a group of one or more active cable interface circuit cards that provide radio frequency signals;
at least one spare cable interface circuit card, each spare cable interface circuit card comprising circuitry that is substantially similar to each of the group of one or more active cable interface circuit cards;
a plurality of switching circuit cards, each switching circuit card being coupled to, and corresponding to, one of either the group of one or more active circuit cards or the at least one spare cable interface circuit card, wherein each switching circuit card corresponding to an active circuit card comprises a switch having a first input which is daisy-chain coupled with a switch circuit from an immediately preceding switching circuit card, a second input coupled to said dedicated active cable interface circuit card and a connection for inputting and outputting RF signals to and from subscriber cable modems, and wherein each switching circuit card coupled to the one of the at least one spare cable interface circuit card comprises a feed-through switch circuit with a single input coupled to said spare cable interface circuit card and a single output which is daisy-chained coupled to a succeeding switching circuit card that is coupled with an active circuit card; and
a first controller circuit card comprising controller circuitry coupled to each switch of the plurality of switching circuit card switches, the controller circuitry generating control signals for switching a position of the switch on a first switching circuit card in response to a detection of faulty operation on a first active cable interface circuit card of the plurality of active cable interface circuit cards.

17. The system of claim 16 and further comprising a mid-plane circuit card having mechanical and electrical means for coupling each of the group of one or more active cable interface circuit cards to a different switching circuit card, and for coupling each of the at least one spare cable interface circuit card to a different feed-through switch circuit card, the mid-plane circuit card additionally coupling the first controller circuit card to each of the switching circuit cards.

18. The system of claim 16 and further including a second controller card comprising controller circuitry substantially similar to the controller circuitry of the first controller card.

19. The system of claim 18 wherein the second controller card is coupled to the mid-plane circuit card such that it is mechanically coupled to and electrically isolated from the plurality of switching circuit cards.

20. The system of claim 19 wherein the second controller is electrically coupled to the plurality of switching circuit cards upon a fail status of the first controller card.

* * * * *